UNITED STATES PATENT OFFICE.

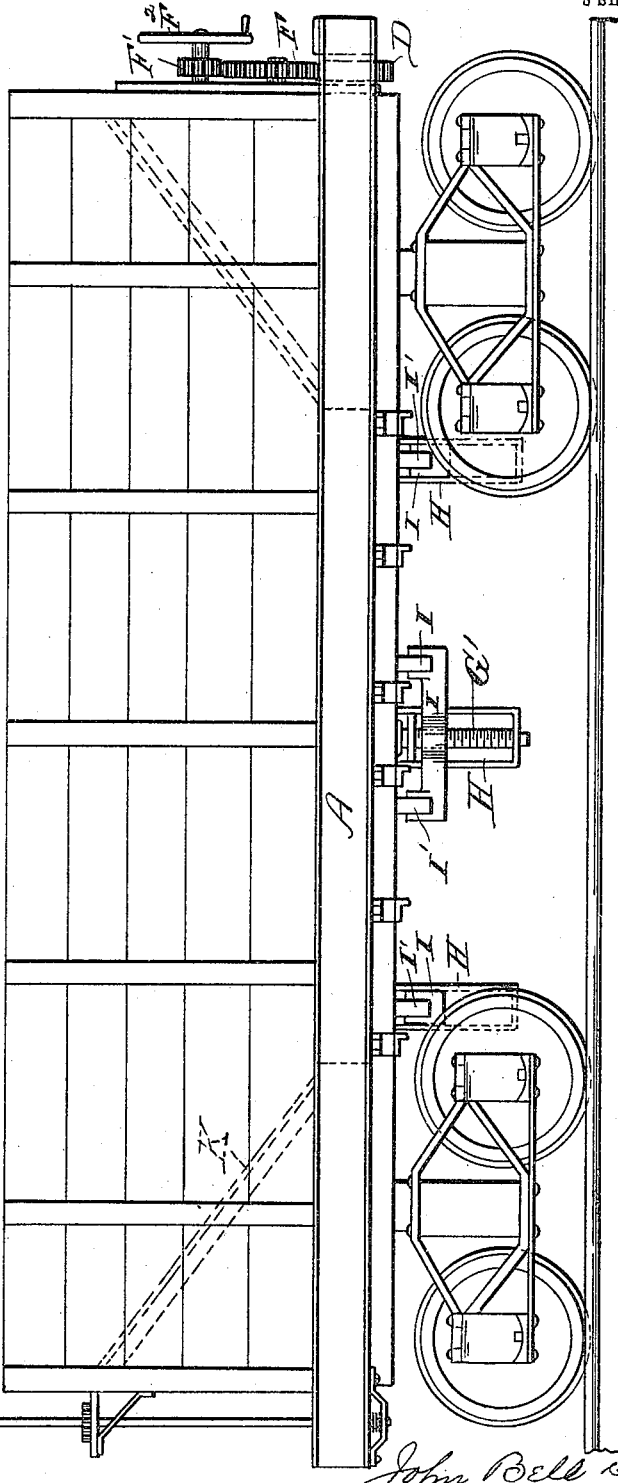

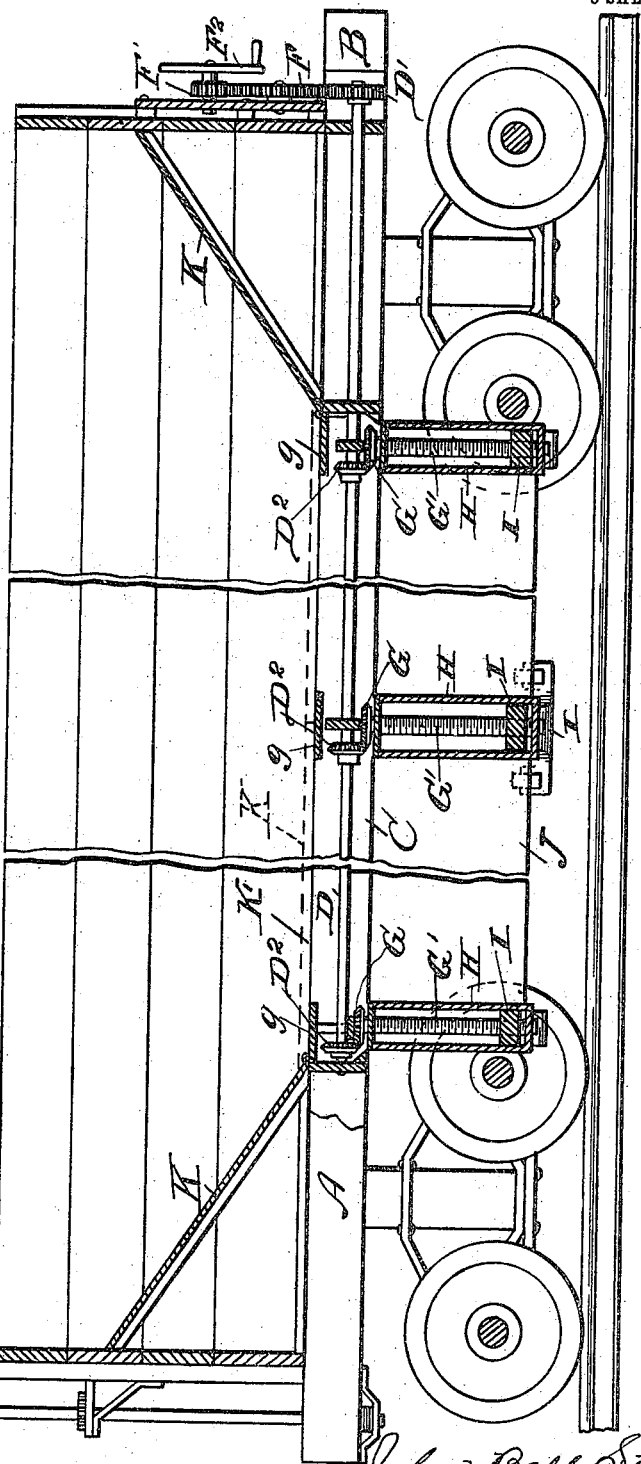

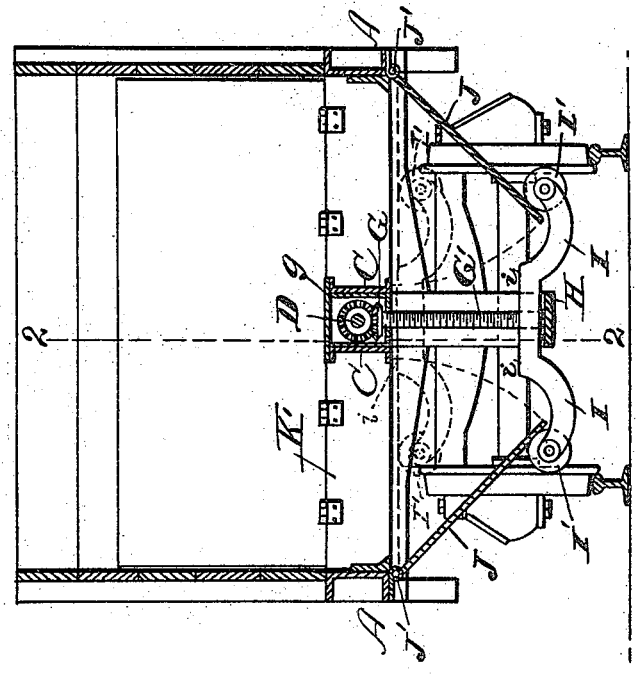
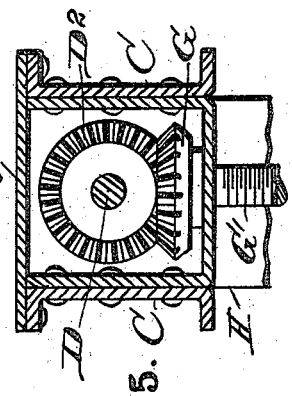
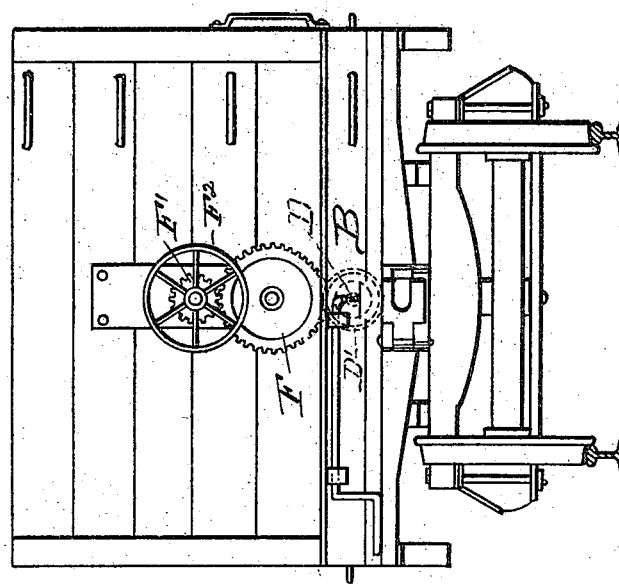

JOHN BELL SHELTON, OF DETROIT, MICHIGAN.

DUMP CAR AND CART.

962,593.  Specification of Letters Patent.  Patented June 28, 1910.

Application filed January 13, 1910. Serial No. 537,927.

*To all whom it may concern:*

Be it known that I, JOHN BELL SHELTON, citizen of the United States, residing at Detroit, county of Wayne, State of Michigan, have invented a certain new and useful Improvement in Dump Cars and Carts, and declare the following to be a full, clear, and exact description of the same, such as will enable others skilled in the art to which it pertains to make and use the same, reference being had to the accompanying drawings, which form a part of this specification.

My invention relates to dump cars for conveying sand, gravel, grain, or like material, shown in the accompanying drawings and more particularly pointed out in the following specification and claims.

The object of this invention is an improvement in the general construction of dump cars, but more especially relating to the mechanism for lowering and raising the discharge doors.

One object is to dispense with the usual locking or latching mechanism employed to secure the doors when in position to receive a load,—which mechanism must first be released before the doors can be lowered to discharge the contents of the car.

Another object is to provide means whereby the discharge doors may be opened to any desired degree,—within their field of operation,—remaining wherever set without the intervention of independent locking or latching mechanism.

Another object of the invention consists in constructing the car so that it may be used either as a dump car or as an ordinary flat-bottom car, the dumping mechanism not interfering with its use as a flat-bottom car on account of its location below the floor between the center sills.

Other advantages and improvements will hereafter appear.

In the drawings accompanying this specification: Figure 1 is a side elevation of a car with the dumping doors in position to receive a load. Fig. 2 is a longitudinal sectional view through the car—with parts broken away—showing the dumping doors in position to discharge a load. Fig. 3 is an end elevation of the car showing the hand operating wheel for actuating the dumping mechanism. Fig. 4 is a cross-sectional view of the car showing the dumping doors in their discharge position, and in dotted lines the position of the doors and that of the mechanism for raising them when in condition to receive a load. Fig. 5 is a detail view in section showing the manner of hooding over the beveled gears controlling the raising and lowering of the discharge doors to shield them from the entry of grit, grain, etc.

Referring now to the letters of reference placed upon the drawings: A denotes the side sills, B the end sills, and C the center sills of the car all of which are of the usual construction.

D is a shaft lodged between the central sills and journaled in cross members in turn supported by the car frame.

D′ is a gear mounted on the end of the shaft D meshing with the idler F supported in a suitable bearing secured to the end wall of the car. The idler F is actuated by a pinion F′ on the shaft of the hand wheel F², in turn mounted in a bearing attached to the car body.

Mounted on the shaft D at intervals throughout its length are bevel gears D² which severally mesh with the respective gears G carried by the screw shafts G′.

$g$ are separate hoods or may be a continuous top plate covering the bevel gears and bolted to the central sills to protect the gears from the entry of gravel, grain, or other grit. The screw shafts G′ are each journaled in depending yokes H secured to the frame of the car.

I are adjustable arms projecting through the yokes H and severally meshing with their respective screw shafts G′ along which they are designed to travel. Mounted in the projecting ends of the arms I are rolls I′ adapted to bear upon the underside of the dump doors J hinged at J′ to the side sills of the car.

In order to provide several supporting points for the dump doors J, I prefer to shape the arms I in the form shown in Fig. 4 of the drawings so that when the doors are closed their free ends rest upon the shoulder $i$ while the rolls support the center line of the door; a third supporting point being the line of hinges attached to the side sills of the car. This construction insures a more perfect seating of the doors preventing the sifting of sand, fine ore, or grain at the point of opening in the course of transit.

By thus supporting the doors at several points they are prevented from sagging or getting out of shape.

While I have shown the dump doors hinged to the outer sills they may be hinged to the center sills of the car,—the load being then dumped to the outside of the rail. When so arranged the adjustable arms I are made longer to more perfectly support the doors at their free ends. If desired the adjustable arms I may be H-shaped when viewed in plan and a pair of friction rolls I' pivoted on each outer member of the arms in order to add additional bearing points to support the dumping doors.

K are doors which when closed form the floor when employed as a flat-bottom car. The doors K are hinged to suitable cross beams, their free ends when manually raised bearing against the ends of the car body, thereby forming an inclined or hopper-shaped bottom to the car designed to direct the contents of the same toward its central opening K'. When the doors are lowered, as indicated in dotted lines in Fig. 2 of the drawings, the opening through the bottom of the car is closed;—the car may then be used for all purposes for which a flat-bottom car is adapted.

Having indicated the several parts by reference letters, the operation of the mechanism will be readily understood. Assuming the doors K are in the position indicated in Fig. 2 and the dump doors J are in the position shown in dotted lines in Fig. 4 and that it is desired to discharge the contents of the car, the hand wheel F² is operated by means of which the train of gears F' and D' are actuated, thereby rotating the shaft D and by it the bevel gears D², and G of the several screw shafts G'. This action serves to lower the several adjustable arms I which support the dump doors in their elevated position. As the arms descend the doors will follow by gravity and the contents of the car be discharged. Should it be desired to set the doors at any angle other than that of the maximum opening in order to direct the discharge of gravel or other material at any particular point in the road bed, it is only necessary to adjust the doors to the opening desired,—the construction being such that no locking mechanism is required to secure them in this position, due to the well known action of the screw shafts. Therefore by the use of this form of gear I am able to dispense with all independent locking mechanism to secure the doors either in their closed position or at any desired degree of opening. To put the car in condition to receive another load, the hand wheel is operated in the reverse manner to that just described, by means of which the arms I are forced upward carrying with them the dump doors J until they again occupy the position indicated in dotted lines in Fig. 4.

Particular attention is directed to the fact that the dumping mechanism does not in any way interfere with the use of the carrier as an ordinary flat-bottom car,—the operating mechanism being entirely below the floor level and when the end doors K are lowered the car assumes the usual capacity of an ordinary flat-bottom car.

While I have described this invention as applied to railroad cars, it is equally well adapted for horse drawn carts or wagons employed on road or other construction work.

Having thus described my invention, what I claim is:—

1. In a dumping carrier, bottom doors hinged to the frame of the carrier, a plurality of screw shafts projecting downwardly below its floor level in a single row between the side frames of the carrier, adjustable arms severally mounted upon said respective screw shafts adapted to actuate and support the doors, and means for simultaneously rotating said screw shafts whereby the doors may be raised or lowered.

2. In a dumping carrier, doors hinged to the frame of the carrier, a plurality of screw shafts arranged in a single row and suitably journaled between the side frames of the carrier, a plurality of adjustable arms severally mounted upon the respective screw shafts adapted to actuate and support the doors, a beveled gear mounted upon each of the several screw shafts, a drive shaft supported longitudinally of the carrier, a plurality of beveled gears mounted upon said shaft adapted to mesh respectively with the beveled gears carried by the screw shafts, and means for rotating said drive shaft whereby the several adjustable arms may be simultaneously actuated and the doors operated, substantially as described.

3. In a dumping car, a plurality of doors hinged in pairs, their free ends closing along the center of the car, a plurality of adjustable arms adapted to support the free ends of the doors provided with internally formed screws, a plurality of screw shafts suitably journaled severally in mesh with the screws of the adjustable arms, a bevel gear mounted on the end of each of the screw shafts, a shaft suitably journaled and provided with a plurality of beveled gears respectively meshing with the several first named bevel gears, a gear mounted on the end of said shaft, suitable gearing adapted to actuate said last named gear, and means for rotating said gearing, substantially as described.

4. In a dump car, a plurality of doors hinged to the side frames and designed to meet in pairs along the center line of the car, a plurality of adjustable arms adapted to support the free ends of said doors and provided at their outer ends with frictional rolls contacting with the underside of the doors, each arm being provided with an internal screw, screw shafts suitably journaled severally in mesh with the internal screws of the adjustable arms, a bevel gear mounted on each of the screw shafts, a shaft, a plurality of bevel gears mounted upon said shaft and severally in mesh with the first named bevel gears, and means for rotating said shaft.

5. In a dump car, a plurality of doors hinged to the frame, their free ends abutting when closed, a plurality of arms arched to provide a support for the doors near their edge and center line when closed, a plurality of screw shafts suitably journaled adapted to raise and lower said arms, and means for simultaneously operating said shafts whereby the doors may be raised or lowered.

6. In a dump car, hinged floor doors adapted to be manually raised to form a hopper, a plurality of downwardly swinging doors hinged to the car frame, a plurality of adjustable arms adapted to support said last named doors provided with internally formed screws, a plurality of screw shafts suitably journaled severally meshing with the internal screws of the adjustable arms, a bevel gear mounted on each of the screw shafts, a shaft, a plurality of bevel gears mounted upon said shaft severally meshing with the bevel gears carried by the screw shafts, a guard plate to shield the gears from grit, and means for rotating the shaft whereby the adjustable arms are simultaneously operated and the doors actuated.

In testimony whereof, I sign this specification in the presence of two witnesses.

JOHN BELL SHELTON.

Witnesses:
 GRACE E. WYNKOOP,
 SAMUEL E. THOMAS.